US006642986B2

(12) United States Patent
Melnik et al.

(10) Patent No.: US 6,642,986 B2
(45) Date of Patent: Nov. 4, 2003

(54) LIQUID CRYSTAL DISPLAY DEVICE HAVING UNIFORM INTEGRATED SPACERS

(75) Inventors: George A. Melnik, Montrose, NY (US); Lucian R. Albu, New York, NY (US); Peter J. Janssen, Scarborough, NY (US); Stefan Hausser, Ludwigsburg (DE); Joerg Spengler, Sindelfingen (DE); Karl-Heinz Kraft, Stuttgart (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 09/833,718

(22) Filed: Apr. 13, 2001

(65) Prior Publication Data

US 2002/0149734 A1 Oct. 17, 2002

(51) Int. Cl.[7] ............... G02F 1/1345; G02F 1/1339; G02F 1/1343
(52) U.S. Cl. ............... 349/149; 349/139; 349/155; 349/156
(58) Field of Search ................ 349/139, 149, 349/155, 156

(56) References Cited

U.S. PATENT DOCUMENTS 3,861,783 A * 1/1975 Dill et al. .................. 349/156
6,067,144 A * 5/2000 Murouchi .................. 349/156
6,266,121 B1 * 7/2001 Shigeta et al. ............. 349/156
6,465,268 B2 * 10/2002 Hirakata et al. ............ 438/30
6,493,057 B1 * 12/2002 Sato et al. .................. 349/153
2002/0149720 A1 * 10/2002 Janssen et al. ............. 349/113

* cited by examiner

Primary Examiner—John F. Niebling
Assistant Examiner—Jennifer M. Kennedy

(57) ABSTRACT

A reflective liquid crystal display (LCD) device includes a plurality of openings patterned in the pixel metal layer in the peripheral region of the device exposing the insulating layer beneath, a plurality of light-shielding islands beneath the openings in the pixel metal layer, and a plurality of walls formed on the islands surrounding the openings and extending substantially between the islands and the pixel metal layer. A plurality of spacers are disposed on the exposed portions of the insulating layer in the peripheral region for supporting the transparent (e.g., glass) layer above and providing a space for the liquid crystal material. The structure enhances display uniformity by making the spacers formed in the peripheral area more closely match the spacers formed in the pixel area of the device. The structure also prevents light from reaching the substrate in the peripheral region of the device and permits portions of the second metal layer formed in the peripheral region of the device to be used for signal routing.

18 Claims, 3 Drawing Sheets

LIQUID CRYSTAL DISPLAY DEVICE HAVING UNIFORM INTEGRATED SPACERS

BACKGROUND OF THE INVENTION

1) Field of the Invention

This invention pertains to the field of liquid crystal display (LCD) devices, such as liquid crystal on silicon (LCOS) devices, and more particularly to a structure for such a device providing for uniform spacers.

2) Description of the Related Art

Reflective LCD devices are well known. Examples of such devices, and in particular active matrix devices, are shown in U.S. Pat. Nos. 6,023,309 and 6,052,165. With reference to the following description, familiarity with conventional features of such devices will be assumed, so that only features bearing on the present invention will be described.

FIG. 1 shows a portion of a typical prior-art reflective LCD device 100. The reflective LCD device 100 may generally be divided into a pixel region 100a (active region) and a peripheral region 100b. The pixel region 100a includes an array of pixel elements and the peripheral region 100b includes driver circuits 105 for supplying driving signals to each of the pixel elements.

The LCD device 100 comprises, in relevant part, a silicon substrate 110, an insulating layer 112, a liquid crystal layer 114, a transparent electrode 116, such as indium-tin-oxide (ITO), and a transparent (e.g., glass) layer 118. A reflective mirror (pixel) metal layer 120 is provided beneath the liquid crystal layer 114 on the insulating layer 112. The mirror metal layer 120 includes a plurality of individual reflective pixel electrodes 120a in the pixel region 100a, and a substantially continuous peripheral portion 120b formed in the peripheral region 100b of the LCD device 200. Light transmissive regions 122 are located between the pixel electrodes 120a.

Also provided in the insulating layer 112 and between the mirror metal layer 120 and the substrate 110 are a light shield metal layer 124 and routing metal layers, 128 and 130. In the pixel region 100a, the metal layers 128 and 130 form mutually-orthogonal row and column lines, which may be connected to gate and source electrodes of MOS transistors (not shown in FIG. 1) for pixel elements fabricated in the underlying substrate 110. In the peripheral region 100b, the metal layers 128 and 130 form signal routing lines used for routing various signals of the driver circuits. Also, metal plugs or vias 132 are provided for connecting various portions of the light shield metal layer 124 and the third and fourth metal layers 128, 130 with each other.

The metal layer 124 is provided to prevent light entering the device, such as through the transmissive regions 122 between the pixel electrodes 120a, from reaching the substrate 110 where it might induce leakage currents on otherwise interfere with proper device operation. While portions of metal layers 128 or 130 may incidentally block a small portion of light entering the device, the structure of FIG. 1 requires a separate metal layer 124 to be dedicated to provide the required degree of light blocking in the peripheral region 100b.

A plurality of spacers or pillars are provided for supporting the transparent layer 118 and providing a gap for the liquid crystal layer 114. In the pixel region 100a, the spacers 134a are placed directly on the insulating layer 112. In the peripheral region 100b, spacers 134b are provided on the peripheral portion 120b of the mirror metal layer 120.

In order to maintain a uniform liquid crystal cell gap, it becomes necessary for the spacers in the peripheral region 100b to have a height that is the same as the spacers in the pixel region 100a. However, the spacers 134b formed on the mirror metal layer 120 in the peripheral region 100b are taller than the spacers 134a formed on the insulating layer 112 in the pixel region 100a because of the extra height of the metal layer 120, thus producing a non-uniform display.

Accordingly, it would be desirable to provide a liquid crystal display device having spacers with a more uniform height in both the pixel and peripheral regions of a reflective LCD device. Other and further objects and advantages will appear hereinafter.

SUMMARY OF THE INVENTION

It is therefore an object of the invention to provide a liquid crystal display (LCD) device having a more uniform spacer structure.

In accordance with one aspect of the invention, an LCD device is provided having a pixel region and a peripheral region adjacent to the pixel region, comprising a silicon substrate, an insulating layer on the substrate, a first metal layer above the insulating layer including an array of pixel electrodes in the pixel region and a peripheral portion in the peripheral region having a plurality of openings therein, a plurality of spacers in the openings, a second metal layer between the first metal layer and the substrate, and a plurality of walls each corresponding to one of the plurality of openings and extending substantially between the second metal layer and the first metal layer.

DETAILED DESCRIPTION

Figure 1:
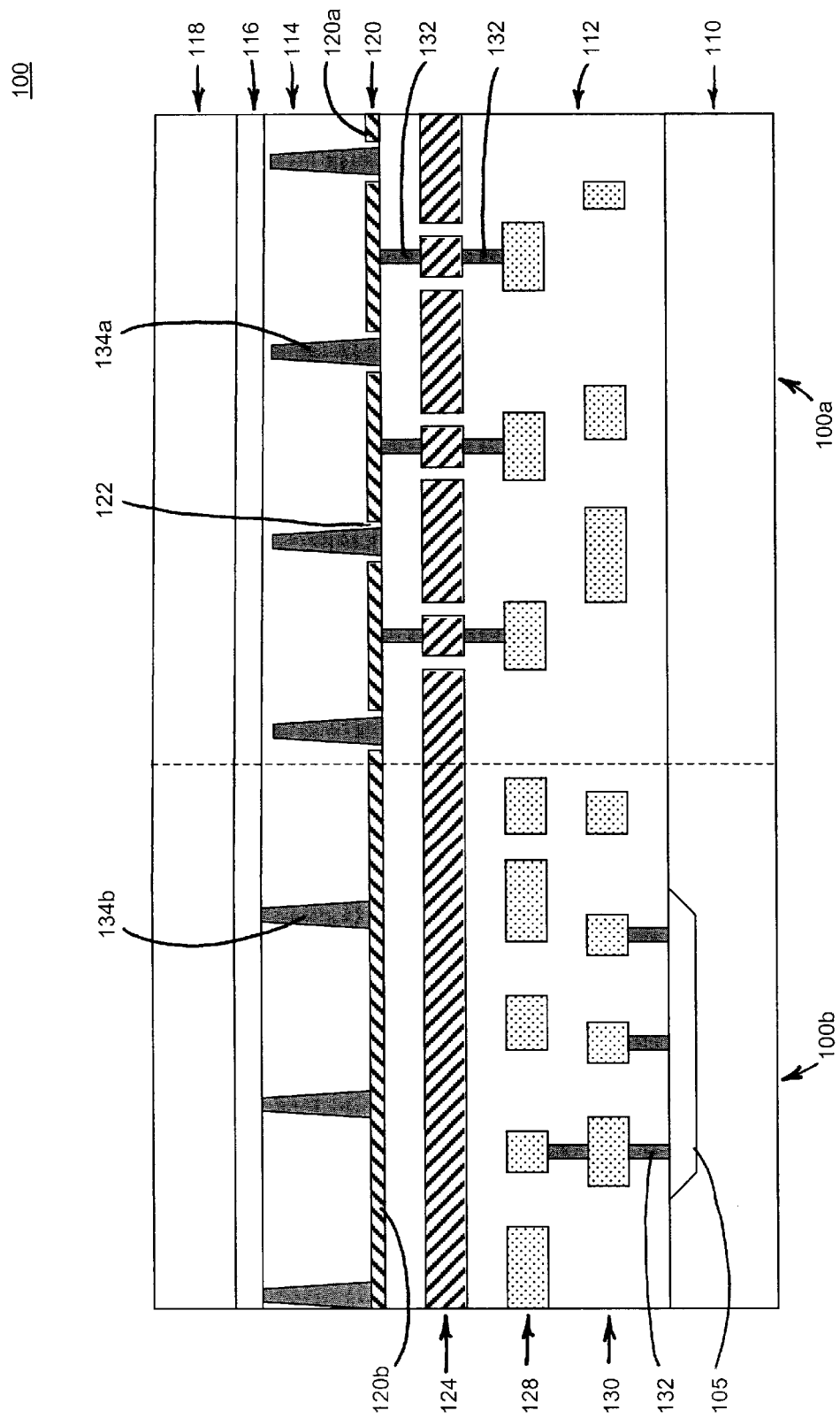
FIG. 1 shows a simplified cross-sectional view of a portion of a prior-art liquid crystal display (LCD) device.
Figure 2:
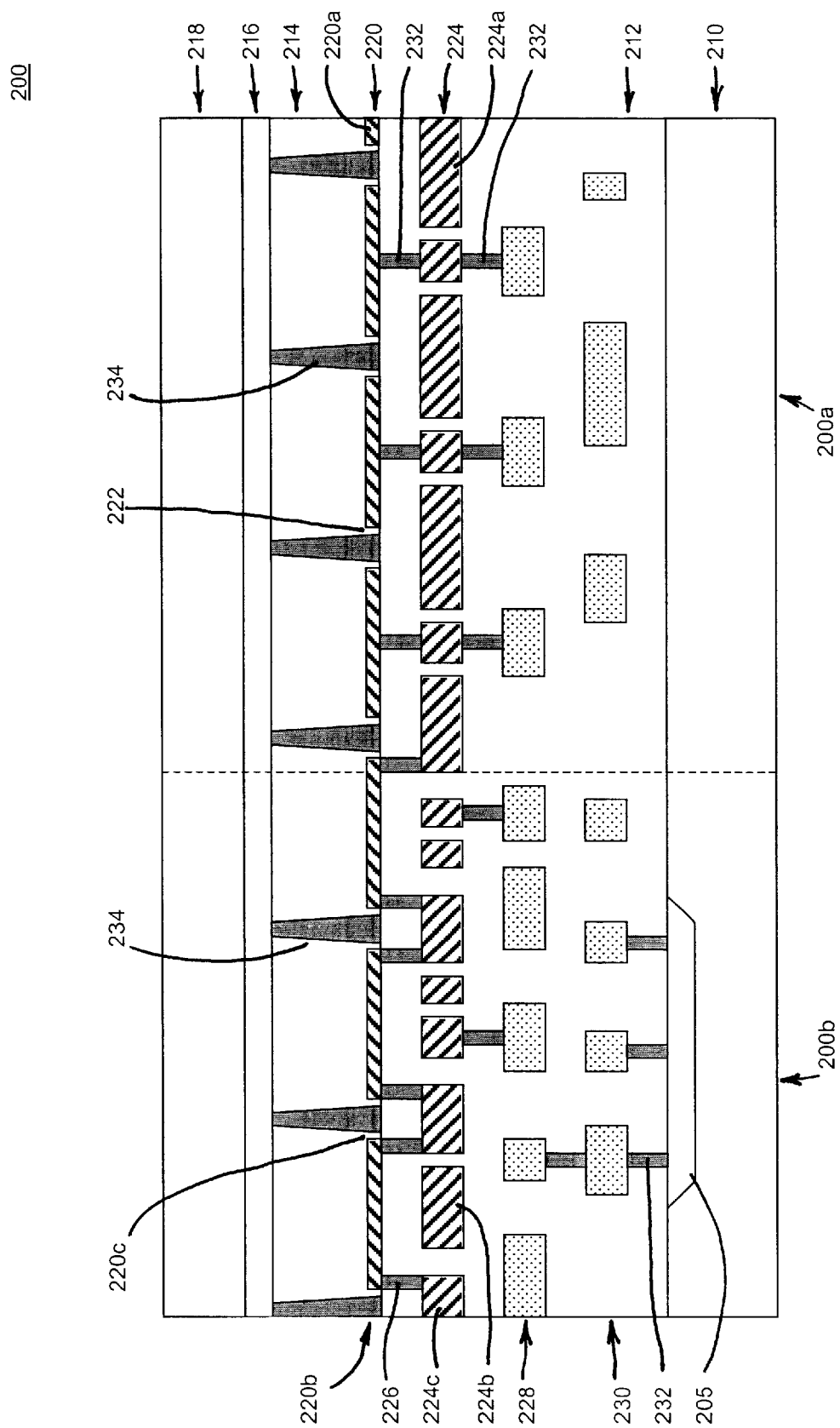
FIG. 2 shows a simplified cross-sectional view of a portion of one embodiment of an LCD device having integrated spacers in accordance with one or more aspects of the invention.

FIG. 2 shows a simplified cross-sectional view of a portion of a reflective LCD device 200 in accordance with one or more aspects of the invention. For clarity, those portions of the device relating to the present invention are illustrated. The reflective LCD device 200 may generally be divided into a pixel region 200a (active region) and a peripheral region 200b. The pixel region 200a includes an array of pixel elements, and the peripheral region 200b includes driver circuits (not shown in FIG. 2) for supplying driving signals to each of the pixel elements.

The LCD device 200 comprises, in relevant part, a silicon substrate 210 on which are successively provided an insulating layer 212, a liquid crystal layer 214, a transparent electrode 216, such as indium-tin-oxide (ITO), and a transparent (e.g., glass) layer 218. A first metal layer 220 is provided on the insulating layer 212 beneath the liquid crystal layer 214. The first metal layer 220 includes a plurality of individual reflective pixel electrodes 220a formed in the pixel region 200a, and a peripheral portion 220b formed in the peripheral region 200b of the LCD device 200. Light transmissive regions 222 are located between the pixel electrodes 220a. A plurality of openings 220c are formed in the peripheral portion 220b of the first metal layer 220, each opening exposing a portion of the insulating layer 212.

Also, a second metal layer 224 is provided between the first metal layer 220 and the substrate 210. The second metal layer 224 includes a light shield portion 224a in the pixel region 200a, and a plurality of signal routing lines 224b and light shields 224c in the peripheral region 200b. At each of the light shields 224c is provided a light-blocking partition or wall 226 extending substantially between the light shield 224c and the peripheral portion 220b of the first metal layer 220. Third and fourth metal layers 228 and 230 are provided between the second metal layer 224 and the substrate 210. Also, metal plugs or vias 232 are provided for connecting various portions of the second, third, and fourth metal layers with each other.

A plurality of integrated spacers or pillars 234 are provided for supporting the transparent electrode 216 and transparent layer 218 and providing a gap for the liquid crystal layer 214. In the pixel region 200a, the spacers 234 are placed directly on the insulating layer 212 in the light transmissive regions 222 between the pixel electrodes 220a. In the peripheral region, the spacers 234 are located on the openings 220c in the peripheral portion 220b of the first metal layer 220. Preferably, the spacers 234 may be formed by uniformly applying a coating (e.g., $Si_3N_4$; $SiO_2$) over the first metal layer 220 and exposed insulating layer 212 to a desired height, and etching the coated material to produce the spacers 234. The height and diameter of the spacers 234 are selected to provide the desired gap for the liquid crystal layer 214, and the required strength to support the transparent layer 218. In one embodiment, the spacers 234 may have a height of 1–2 $\mu$m, and as small a diameter as 0.4 $\mu$m. Larger spacers, which simply the manufacturing process, may also be employed.

An operation of various pertinent elements of the embodiment will now be described.

Beneficially, the first metal layer 220 is a mirror (pixel) metal layer, such that it blocks light which directly impinges on it from reaching the substrate 210. However, openings 220c are produced in the peripheral portion 220b of the first metal layer 220 in the peripheral region 200b so that the spacers 234 in the peripheral region 200b may be of a uniform height with the spacers 234 in the pixel region 200a. Accordingly, it is necessary to prevent light which impinges on the openings 220c from reaching the substrate 210.

For this purpose, it is possible to use the second metal layer 224 as a substantially continuous dedicated light shielding area covering the entire peripheral region 220b. In that case, any light which would pass through the openings 220c in the first metal layer 220 would be blocked by the second metal layer 224 from reaching the substrate 210 in the peripheral region 200b.

However, the area required for the driver circuits 205 can be reduced if the metal layer 224 could also be used for routing driver circuitry signals in the peripheral region 200b, instead of being dedicated only to light blocking.

Accordingly, in the preferred embodiment, the second metal layer 224 includes the light shields 224c in the peripheral region 200b arranged beneath each of the openings 220c. Preferably, each light shield 224c is an island, substantially disconnected from a remainder of the second metal layer 224. Additionally, on each of the light shields 224c is provided the light blocking partition or wall 226 extending substantially between the light shield 224c and the peripheral portion 220b of the first metal layer 220. Preferably, the wall 226 is continuously formed around the entire opening 220c. Also, preferably, the wall 226 extends vertically to connect the light shield 224c to the peripheral portion 220b of the first metal layer 220.

Figure 3:
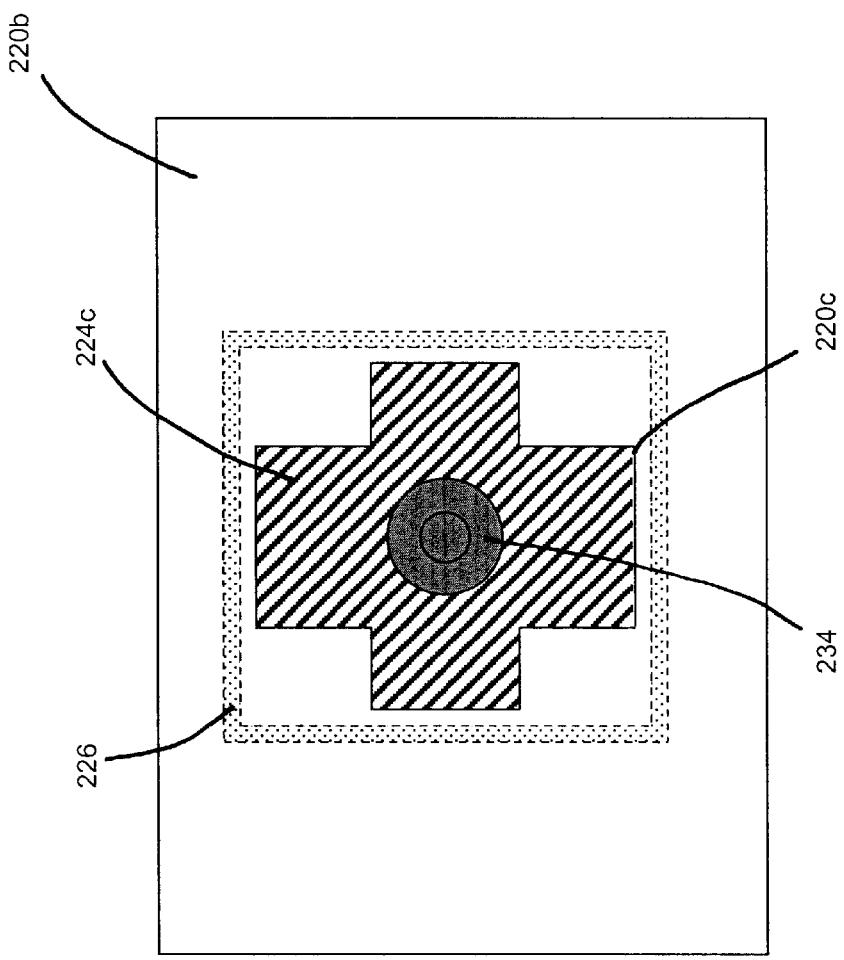
FIG. 3 shows a top plan view of a portion of the LCD device shown in FIG. 2.

FIG. 3 shows a top plan view of a portion of the peripheral region 200b of the LCD device 200 in the vicinity of one of the openings 220c in the first metal layer 220. As shown in FIG. 3, in one embodiment the opening 220c in the peripheral portion 220b of the first metal layer 220 is in the shape of a cross, and the spacer 234 is located in the middle of the intersection of the cross. In one embodiment, the end-to-end length of the "cross" in each of the "x" and "y" directions is 1.2 $\mu$m. This mimics the area between pixel electrodes 220a where the spacers 234 are located in the pixel region 200a, producing better display uniformity.

Meanwhile, the light shield 224c is an island that may be of any convenient size or shape, so long as it is at least as large as the opening 220c. In one embodiment, the length of the light shield in each of the "x" and "y" directions is 3.5 $\mu$m. The wall 226 may also be of any convenient size or shape, so long as it substantially encloses the opening 220c, and is no larger than the light shield 224c.

Preferably, the wall 226 is formed by patterning a vertically-extending via in the insulating layer 212 and depositing a light-blocking material therein prior to depositing the first metal layer 220. The wall 226 may be formed in a same step as the formation of the metal plugs 232 connected to the pixel electrodes 220a. Also, preferably, the wall 226 is formed of Tungsten. In this case, the wall 226 is formed of the same material as the vias 232 in the insulating layer 212, thus requiring no additional processing steps. However, other light blocking materials and methods of fabrication may be used. In one embodiment, the wall 226 has a height of approximately 1 $\mu$m so as to extend vertically between and connect the first metal layer 220 and the second metal layer 224. In that case, the thickness of the wall 226 may be approximately 0.4 $\mu$m.

While the present invention has been particularly shown and described with reference to the preferred embodiments thereof, it will be understood by those skilled in the art that various changes in detail may be made without departing from the scope of the invention as defined by the claims.

What is claimed is:

1. A liquid crystal display (LCD) device having a pixel region and a peripheral region adjacent to the pixel region, comprising:
    a silicon substrate;
    an insulating layer on the substrate;
    a first metal layer above the insulating layer, comprising
        array of pixel electrodes in the pixel region, and
        a peripheral portion in the peripheral region having a plurality of openings therein exposing portions of the insulating layer;
    a plurality of spacers on the exposed portions of the insulating layer in the peripheral region;
    a second metal layer between the first metal layer and the substrate, comprising
        a plurality of light shields beneath the openings in the peripheral portion of the first metal layer, and
        a plurality of signal routing lines in the peripheral region; and
    a plurality of walls, each corresponding to a corresponding one of the plurality of openings and extending substantially between the second metal layer and the first metal layer.

2. The LCD device of claim 1, wherein each wall is substantially continuous around the corresponding opening.

3. The LCD device of claim 1, wherein the wall comprises an opaque material.

4. The LCD device of claim 1, wherein each of the plurality of light shields is an island.

5. The LCD device of claim 1, wherein each of the plurality of walls is on a corresponding one of the light shields.

6. The LCD device of claim 1, further comprising third and fourth metal layers between the second metal layer and the substrate, the third and fourth metal layers each including a plurality of additional signal routing lines in the peripheral region.

7. The LCD device of claim 1, further comprising a plurality of spacers on the insulating layer between the pixel electrodes in the pixel region.

8. The LCD device of claim 1, further comprising at least one spacer between the pixel electrodes in the pixel region having a same height as at least one of the plurality of spacers in the peripheral region.

9. A liquid crystal display (LCD) device having a pixel region and a peripheral region adjacent to the pixel region, comprising:

a substrate;

an insulating layer on the substrate;

a first metal layer above the insulating layer, comprising
an array of pixel electrodes in the pixel region, and
a peripheral portion in the peripheral region having an opening therein;

a spacer in the opening in the first metal layer in the peripheral region;

a second metal layer between the first metal layer and the substrate; and a wall beneath the opening in the first metal layer in the peripheral region and extending substantially between the second metal layer and the first metal layer.

10. The LCD device of claim 9, wherein the wall is substantially continuous around the opening.

11. The LCD device of claim 9, wherein the second metal layer comprises a light shield beneath the opening in the peripheral portion of the first metal layer, and wherein the wall extends substantially between the light shield and the first metal layer.

12. The LCD device of claim 9, further comprising at least one spacer in the pixel region having a same height as the spacer in the peripheral region.

13. The LCD device of claim 9, wherein the opening exposes a portion of the insulating layer and wherein the spacer is on the exposed portion of the insulating layer.

14. A liquid crystal display (LCD) device having a pixel region and a peripheral region adjacent to the pixel region, comprising:

a substrate;

an insulating layer on the substrate;

a first metal layer above the substrate, comprising
an array of pixel electrodes in the pixel region, and
a peripheral portion in the peripheral region having an opening therein;

a spacer in the opening in the first metal layer in the peripheral region;

a second metal layer between the first metal layer and the substrate, comprising
a light shield beneath the opening in the peripheral portion of the first metal layer, and
a plurality of signal routing lines in the peripheral region; and third and fourth metal layers between the second metal layer and the substrate, the third and fourth metal layers each including a plurality of additional signal routing lines in the peripheral region.

15. The LCD device of claim 14, wherein the third and fourth metal layers form mutually-orthogonal row and column lines for the LCD device.

16. The LCD device of claim 14, wherein the light shield is an island.

17. The LCD device of claim 14, further comprising at least one spacer in the pixel region having a same height as the spacer in the peripheral region.

18. A liquid crystal display (LCD) device having a pixel region and a peripheral region adjacent to the pixel region, comprising:

a substrate;

an insulating layer on the substrate;

a first metal layer above the insulating layer, comprising
an array of pixel electrodes in the pixel region and a first plurality of recesses therebetween, and
a peripheral portion in the peripheral region having a second plurality of recesses therein; and a plurality of spacers in the first plurality of recesses and the second plurality of recesses, at least one of the spacers in the first plurality of recesses and at least one of the spacers in the second plurality of recesses having a same height.

* * * * *